US009248371B2

(12) United States Patent
Lim et al.

(10) Patent No.: US 9,248,371 B2
(45) Date of Patent: Feb. 2, 2016

(54) SYSTEM FOR ONLINE ROLE-PLAYING GAME USING DEVELOPING BUILDINGS, AND A METHOD THEREOF

(75) Inventors: Sang-Bum Lim, Seoul (KR); Kyoung-Min Hwang, Seoul (KR)

(73) Assignee: NHN Entertainment Corporation, Seongnam-si (KR)

( * ) Notice: Subject to any disclaimer, the term of this patent is extended or adjusted under 35 U.S.C. 154(b) by 1173 days.

(21) Appl. No.: 11/570,152

(22) PCT Filed: Jun. 7, 2005

(86) PCT No.: PCT/KR2005/001701
§ 371 (c)(1),
(2), (4) Date: Dec. 7, 2006

(87) PCT Pub. No.: WO2005/122053
PCT Pub. Date: Dec. 22, 2005

(65) Prior Publication Data
US 2007/0254741 A1    Nov. 1, 2007

(30) Foreign Application Priority Data

Jun. 7, 2004    (KR) .......................... 10-2004-0041375

(51) Int. Cl.
| | |
|---|---|
| A63F 13/00 | (2014.01) |
| A63F 13/30 | (2014.01) |
| A63F 13/45 | (2014.01) |
| A63F 13/52 | (2014.01) |

(52) U.S. Cl.
CPC ................. *A63F 13/12* (2013.01); *A63F 13/45* (2014.09); *A63F 13/52* (2014.09); *A63F 2300/5546* (2013.01); *A63F 2300/6009* (2013.01); *A63F 2300/8017* (2013.01)

(58) Field of Classification Search
CPC ...................................................... A63F 13/12

USPC ........................................................ 463/6, 42
See application file for complete search history.

(56) References Cited

U.S. PATENT DOCUMENTS

| | | | | |
|---|---|---|---|---|
| 4,295,649 A | * | 10/1981 | Cooper | ........................... 463/59 |
| 6,409,597 B1 | * | 6/2002 | Mizumoto | ...................... 463/31 |
| 2004/0143852 A1 | * | 7/2004 | Meyers | ......................... 725/133 |

FOREIGN PATENT DOCUMENTS

| | | |
|---|---|---|
| JP | 2000-014934 A | 1/2000 |
| JP | 2000-218054 A | 8/2000 |

(Continued)

OTHER PUBLICATIONS

Greg Kasavin, Dark Age of Camelot Review, Oct. 26, 2001, gamespot.com, p. 1.*

(Continued)

*Primary Examiner* — Milap Shah
*Assistant Examiner* — Thomas H Henry
(74) *Attorney, Agent, or Firm* — H.C. Park & Associates, PLC

(57) ABSTRACT

Disclosed is an on-line role-playing game system and method in which buildings arranged on a road map are developed according to a degree of experience of a user who performs a quest. The method includes the steps of a) by a gamer, accessing an on-line role-playing game server; b) by the gamer, executing the on-line role-playing game; c) by the gamer, performing a quest of the on-line role-playing game; d) updating a degree of experience of the gamer when the gamer accomplishes the quest; and e) developing a building arranged on a road map for the performance of the quest in correspondence with the degree of experience of the gamer. According to the present invention, by applying a building development process to an on-line role-playing game, a limited map for progressing an RPG game story can be efficiently utilized, and, in addition, diverse maps reflecting characteristics of gamers who access the same game for a long time can be provided without imposing a burden on a game server.

11 Claims, 11 Drawing Sheets

(56) References Cited

FOREIGN PATENT DOCUMENTS

| | | |
|---|---|---|
| JP | 2003-205170 A | 7/2003 |
| KR | 10-2002-0005282 A | 1/2002 |

OTHER PUBLICATIONS

Kart Rider, Wikipedia entry, retrieved Dec. 4, 2009.*

* cited by examiner quest accomplishment /building development quest accomplishment /building development

SYSTEM FOR ONLINE ROLE-PLAYING GAME USING DEVELOPING BUILDINGS, AND A METHOD THEREOF

CROSS REFERENCE TO RELATED APPLICATIONS

This application is a U.S. National Phase Application of International Application PCT Application No. PCT/KR2005/001701 filed on Jun. 7, 2005, which claims the benefit of priority from Korean Patent Application No. 10-2004-0041375 filed on Jun. 7, 2004. The disclosures of International Application PCT Application No. PCT/KR2005/001701 and Korean Patent Application No. 10-2004-0041375 are incorporated herein by reference.

BACKGROUND OF THE INVENTION (a) Field of the Invention

The present invention relates to an on-line role-playing game system and method, and more particularly to an on-line role-playing game system and method in which buildings arranged on a road map are developed according to the degree of experience of a user who performs a quest.

(b) Description of the Related Art

Great attention has been paid to on-line games as the next generation growth engine. At present, the on-line games occupy a significant percentage of the overall game market and show a rapidly rising growth rate every year with increasing possibility of growth. In such a trend, foremost existing game-related enterprises have established long-term strategies and run businesses for on-line games, and a number of other enterprises are currently joining in the on-line game market.

Although some great work is currently produced in the on-line game market as a result of large-scale investments, differently from the past, a great amount of game software that depends on small-scale capital and manpower in view of characteristics of on-line games has still been developed and come to the market. However, only a small minority of the many games advances to be a top brand and it is realistic that most game-related enterprises suffer from much difficulty in getting into the game market.

Among domestic games, some 3D on-line games that began in the latter half of 2001 have assume assumed third generational characteristics and structures. This may be known from the very concretely represented plan factors of LINEAGE® II of NCSOFT® CORPORATION. As another new trend, on-line games with a variety of formats and backgrounds have appeared, which is not limited to existing role-playing games (RPGs). In addition, an aspect of development to be achieved in the future is the advent of on-line games causing a radical change of a view of the world of on-line games, such as "Tactical Commanders" of the NEXON® CORPORATION, "Outpost Online", and "NavyField", or on-line games materializing diverse social experiences on-line, such as "MotorCity Online" and SIMS™ ONLINE.

On the other hand, from a view point of user interface, games using electronic means may be generally classified into a single player game, a multi-player game, and an on-line multiplayer RPG.

The single player game refers to a game in which a gamer solely operates a game program on a computer. Specifically, the single player game may refer to all games played by a gamer solely, including old arcade games such as SUPER MARIO BROS.® or GALAGA®, up-bringing simulation games such as "PrincessMaker", strategy simulation games such as "Samgugji", and action games such as ROGUE SPEAR® or HALF-LIFE®, irrespective of the genre of the game. Most existing computer games are single player games.

Such a single player game may be said to be a kind of novel from the first-person point of view. The basic framework of the novel is fixed by a game developer, so a gamer cannot help but following the basic frame. That is, in the single player game, a gamer is nothing but a visitor who visits a new cosmos created by a game developer as a master of the cosmos, and leaves the cosmos after trying the flavor of events and all sorts of delicacies set by the game developer. The role of the game developer is therefore extremely important in the single player game. This is because important factors of the game such as a realistic and interesting story (or scenario) of the game, adjustment of a degree of difficulty according to a level of the game, graphic effects as a perceptual factor of actual feeling, and the like, are created by the game developer.

On the other hand, as modifications of the single player game, there are games organized to compete or cooperate between two or more gamers. In addition, recently, games have appeared in which a plurality of gamers play a game simultaneously using their computers directly linked with one another through a wired line or indirectly linked with one another through the Internet. Such games are the wide multi-player games.

Game developers say that the multi-player games organized to compete between a plurality of gamers allows the gamers to be absorbed in the game more deeply and for a longer time because the gamers can always expect new responses and results in the game, while a gamer in the existing single player game can easily predict a result of play of the game as he gets familiar with it because he plays a game with the artificial intelligence (AI) of a computer. Techniques for implementing the multi-player game are complicated, but it is enough to regard the multi-player game as a kind of chess game, Paduk game, or poker game.

On the other hand, the role-playing game (RPG) is a game in which a gamer plays his role in the game to accomplish a given task. In the role-playing game, the gamer first selects one of characters of the game, plays the game using specified personalities such as intelligence, stamina, magic index, and the like of the character, and develops his power through strenuous battles, conversations, or acquisition of items to accomplish his mission. Such a role-playing game is similar to a traditional adventure game. However, in addition to game factors of the adventure game, the role-playing game further includes game factors such as character growth and development, conversational strategic battles, puzzle solutions, and the like. In addition, the role-playing game is a genre of game employing a NPC (Non-Player Character) and has a world of quest and grandiose fantasy.

In addition, a story line of the role-playing game employs a non-linear system, not a linear system as employed in the traditional adventure game, and has actions as an important factor of the game. As typical examples of the role-playing game, there are various games such as DIABLO® of BLIZZARD® ENTERTAINMENT, INC., FINAL FANTASY® VII of SQUARESOFT®, DUNGEON KEEPER® of Bullfrog Company, and "Genesis" series of SoftMax Company. In addition, on-line multi-user dungeon (MUD) games in recent fashion include those such as LINEAGE® of NCSOFT® CORPORATION, "Nation of Wind" of NEXON® CORPORATION, "RedMoon" of JC Entertainment Company, ULTIMA ONLINE® of ORIGIN®, EVERQUEST® of SONY® CORPORATION, and the like.

Scenarios and directing are the most important factors in role-playing games. Of course, fascinating graphics are also important as ever for all games. However, in a role-playing game, the scenario and the directing take precedence over the graphics. Specifically, since characters in the role-playing game are brought up with acting power accumulated based on their fighting strength, capability, experience, and the like, the role-playing game should be designed such that gamers play the game while grasping situations of progress of the game and such that striking power of a hero is strengthened as the hero defeats enemies or his experience is accumulated, and the enemies also strengthen in level of striking power, and accordingly, a degree of difficulty of the game is raised.

On the other hand, the on-line role-playing game, which is also referred to in the technical terminology as MMORPG (Massive Multiplayer Online Role-Playing Game), is a different type of game from the multi-player game. As described earlier, a prototype of the multi-player game may be compared to "Paduk", a chess game, or a poker game in which a plurality of players participate.

Specifically, the multi-player game is over once victory or defeat is decided, although a result of the game is stored. However, a MMORPG is not so. In the MMORPG, the game continues to advance and varies independently of whether or not gamers continue to play the game. Therefore, characters created in the MMORPG are not in non-continual existence, but are in continual existence such that they continually suffer from new events and should adapt themselves to the events.

In addition, the MMORPG is a game of a special form in which a plurality of gamers creates a story and structure of the game by using and modifying environments provided by a game developer. MMORPG environments, set by the game developer, exist as NPCs like monsters. However, what is more important than NPC is Playable Characters handled by the gamers, That is, initial settings of the MMORPG are changed by collective activities of the gamers, which results in a completely different game. This is a process similar to dangerous traffic environments that may be formed if drivers do not observe traffic regulations although the traffic regulations are well enacted.

Now, with the advent of such an on-line role playing game, a conventional industrial social and standardized idea that computer games are designed and produced by game programmers and designers and are nothing but imaginary plays alienated from real affairs and life no longer has a useful meaning.

On the other hand, conventional simulation games, particularly simulation games of land transportation means such as vehicles and motorcycles, mostly employ a system in which a ranking is determined according to only running time of the land transportation means repeatedly running on a fixed track or road.

Hereinafter, a conventional on-line game system and a conventional method of MMORPG racing game will be described with reference to FIGS. 1 and 2.

FIG. 1 is a diagram illustrating a configuration of an example of a conventional on-line game system.

Referring to FIG. 1, the conventional on-line game system is composed of a plurality of gamers 121, 122, and 123, and a game web site 110. The game web site 110 may include an on-line game 111 accessed by the plurality of gamers 121, 122, and 123, a contents server 112, and a game database (DB) 113. When the plurality of gamers 121, 122, and 123 accesses the on-line game 111 in real time on-line through the Internet, the on-line game 111 provides a game to the plurality of gamers 121, 122, and 123 on-line in conjunction with the contents server 112 and the game DB 113 within the game web site 110.

On the other hand, FIG. 2 is a flow chart illustrating a conventional method of a MMORPG racing game.

Referring to FIG. 2, in the conventional method of a MMOPRG racing game, first, a plurality of gamers access a MMORPG racing game (S210), and then, perform a log-in process (S220).

Thereafter, each of the plurality of gamers selects one of a plurality of servers (S230). Next, each gamer selects a racing car or tunes his racing car, and goes through a car preparation procedure of purchasing items and installing the purchased items at the car (S240).

Next, each gamer selects a kind of racing game such as battle racing or destination racing (S250).

Thereafter, each gamer plays a MMORPG racing game in which the plurality of gamers participate (S260).

At this time, the MMORPG racing game is progressed between players (PC) operated by the plurality of gamers (S270). More specifically, for example, battle racing is progressed between a player car and another player car on one road.

Next, the game is progressed according to a MMORPG racing story and each server updates the results of racing in real time (S280).

Thereafter, it is determined whether or not the MMORPG racing game is to be terminated (S290). If it is determined that the MMORPG racing game is to be terminated, the MMORPG racing game is terminated.

However, the conventional RPG gamer server has a problem in that diverse maps reflecting characteristics of gamers who access the same game for a long time cannot be provided without imposing a burden on the servers, and it is difficult to infinitely provide maps for progressing the RPG game story.

SUMMARY OF THE INVENTION

It is therefore an object of the present invention to provide an on-line role-playing game system and method using developing buildings, which is capable of efficiently utilizing a limited map for progressing an RPG game story.

It is another object of the present invention to provide an on-line role-playing game system and method using developing buildings, which is capable of providing diverse maps reflecting characteristics of gamers who access the same game for a long time without imposing a burden on a game server.

In order to achieve the above objects, according to one aspect, the present invention provides an on-line role-playing game method including the steps of A) by a gamer, accessing an on-line role-playing game server; B) by the gamer, executing the on-line role-playing game; C) by the gamer, performing a quest of the on-line role-playing game; D) updating a degree of experience of the gamer when the gamer accomplishes the quest; and E) developing a building arranged on a road map for the performance of the quest in correspondence with the degree of experience of the gamer.

According to another aspect, the present invention provides a method of operating an on-line role-playing game in which a plurality of gamers participate, the method including the steps of A) by the plurality of gamers, accessing an on-line role-playing racing game server; B) by the plurality of gamers, preparing cars of the plurality of gamers; C) by the plurality of gamers, forming a community with other gamers; D) requesting the plurality of gamers to perform quests while the plurality of gamers perform racing on a road with the cars of the plurality of gamers; E) by each of the plurality of gamers, accomplishing an NPC (Non-Player Character) quest while each of the plurality of gamers drives a player (PC) car; F) leveling-up a degree of experience of each gamer according to the accomplishment of the quest; and G) developing a building arranged on a road map for performance of the quest in correspondence with the degree of experience of the gamer.

According to yet another aspect, the present invention provides a system of operating an on-line role-playing game in which a plurality of gamers participate, the system including: an access server for allowing and managing access of the plurality of gamers to the on-line role-playing racing game; a building development program for developing a building arranged on a road map in correspondence with a degree of experience of the gamer when the gamer accomplishes a quest after executing the on-line role-playing game; a role-playing controller for controlling general operations including the access to the role-playing game, the building development, and game progress; a plurality of game servers prepared for each channel so that the plurality of gamers access the game servers to progress the role-playing game to accomplish the quest; a plurality of chatting servers for allowing the plurality of gamers to exchange information when the role-playing game is progressed in the game servers; and a plurality of game DBs for storing game-related information generated for each of the game servers.

According to the present invention, by applying a building development process to an on-line role-playing game, a limited map for progressing an RPG game story can be efficiently utilized, and, in addition, diverse maps reflecting characteristics of gamers who access the same game for a long time can be provided without imposing a burden on a game server.

DETAILED DESCRIPTION OF THE ILLUSTRATED EMBODIMENTS

Hereinafter, an on-line role-playing game system and method using a building development process according to embodiments of the present invention will be described in detail with reference to the accompanying drawings.

Figure 1:
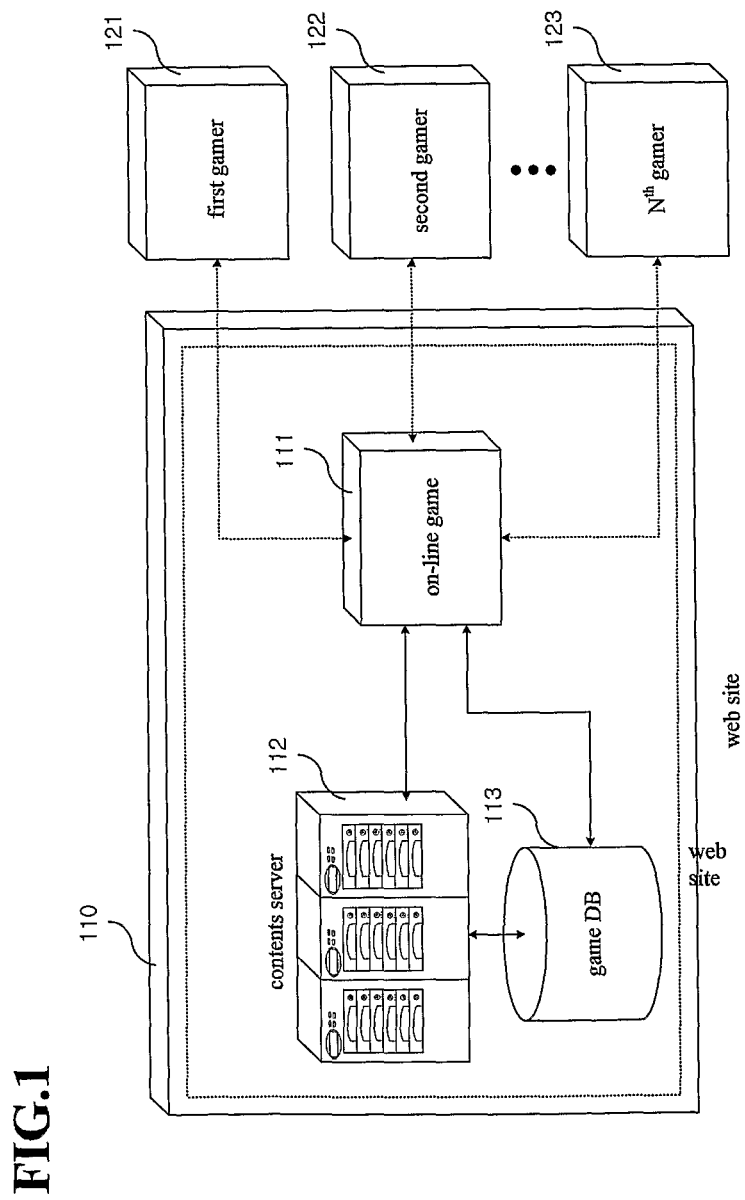
FIG. 1 is a diagram illustrating the configuration of an example of a conventional on-line game system.
Figure 2:
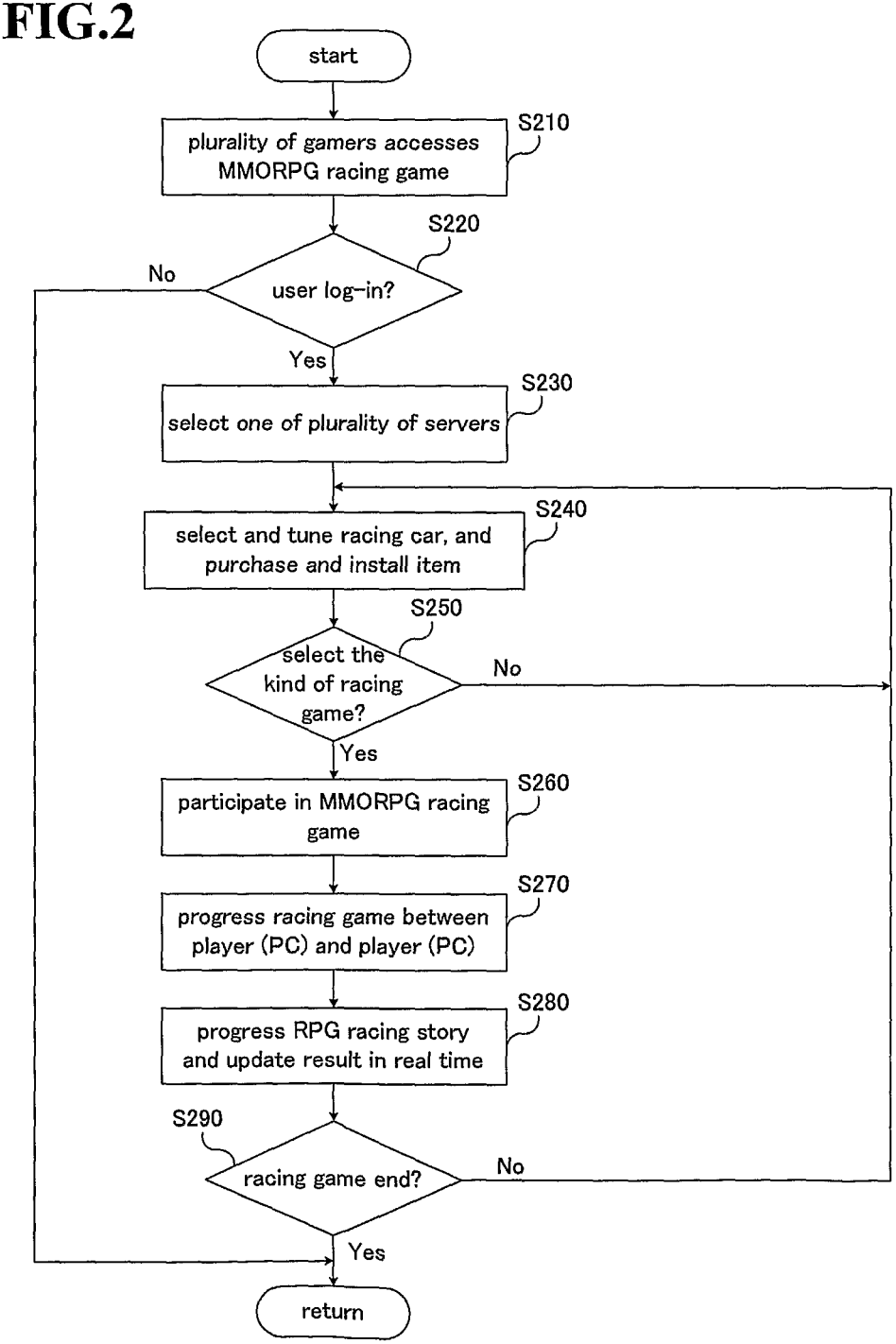
FIG. 2 is a flow chart illustrating a conventional method of a MMORPG racing game.
Figure 3:
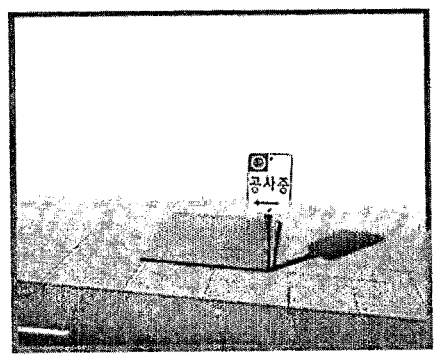
FIG. 3 is a diagram schematically illustrating a building development process of an on-line role-playing game according to an embodiment of the present invention.
Figure 3:
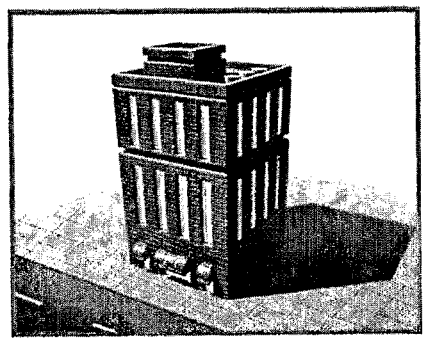
Figure 3:
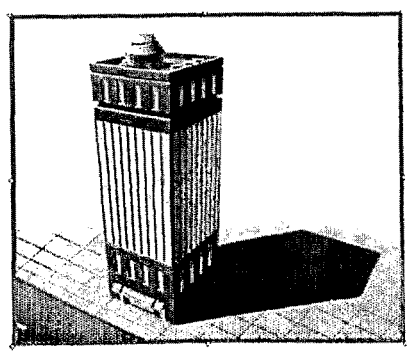

FIG. 3 is a diagram schematically illustrating a building development process of an on-line role-playing game according to an embodiment of the present invention.

The term "quest" in this application refers to a journey towards a goal in a role-playing video game as a plot, which comprises one or more events.

Referring to FIG. 3, when an on-line role-playing game according to an embodiment of the present invention is progressed, a degree of experience of a gamer is increased when a requested quest is accomplished. When the degree of experience reaches a prescribed level, a building arranged on a road map is developed. Specifically, the on-line role-playing game according to the embodiment of the present invention can provide diverse road maps by developing a building according to accomplishment of the requested quest in order to utilize a limited road map efficiently.

The on-line role-playing game according to the embodiment of the present invention is particularly suitable to a racing game. Hereinafter, an on-line role-playing racing game according to an embodiment of the present invention will be described in detail.

Figure 4:
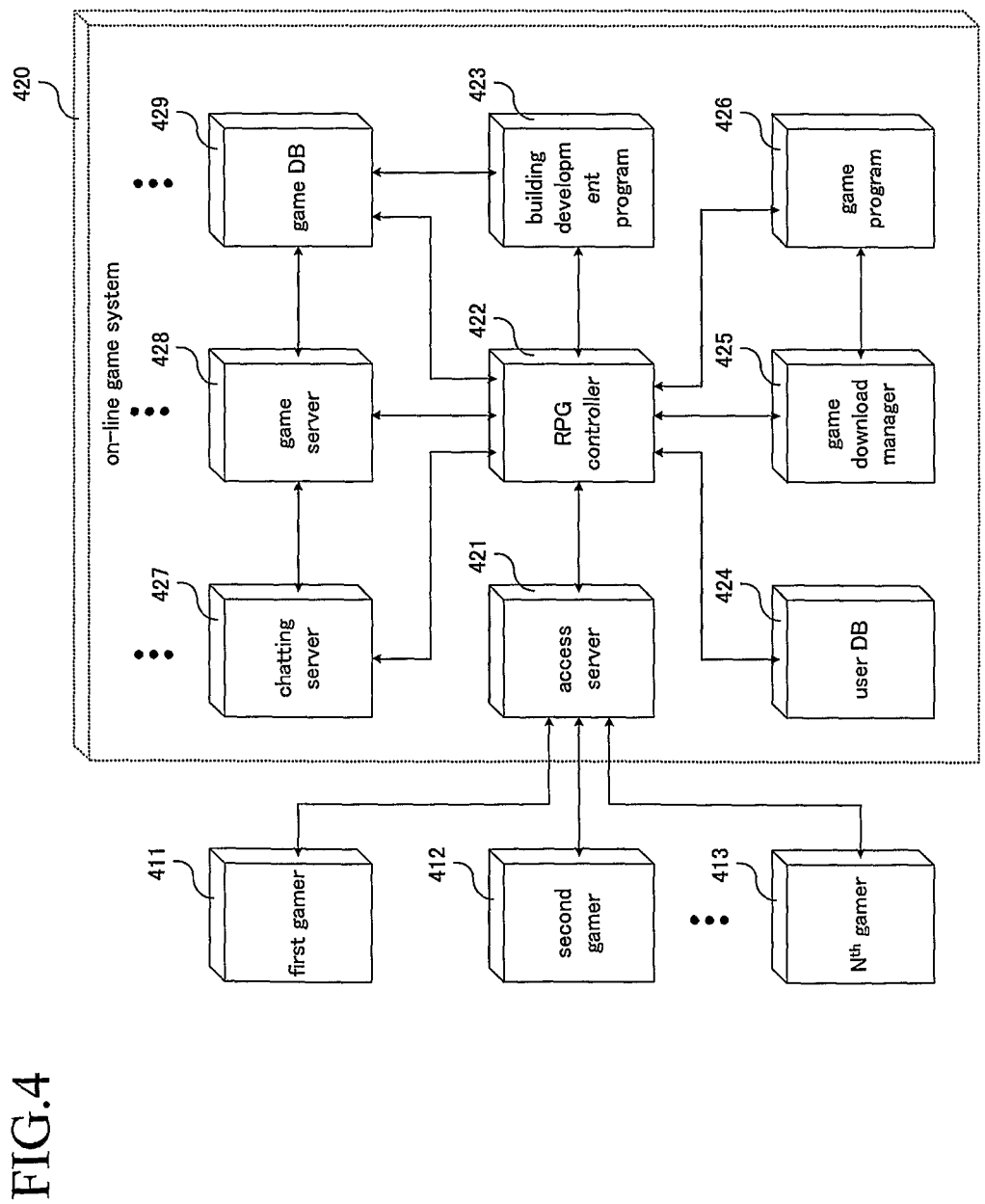
FIG. 4 is a diagram illustrating the configuration of an on-line role-playing game system using a building development process according to an embodiment of the present invention.

FIG. 4 is a diagram illustrating configuration of an on-line role-playing game system using a building development process according to an embodiment of the present invention.

Referring to FIG. 4, an on-line role-playing game 420 according to an embodiment of the present invention includes an access server 421 for allowing and managing access of a plurality of gamers 411, 412, and 413 to the on-line role-playing game, an RPG controller 422, a building development program 423, a user DB 424, a game download manager 425, a game program 426, a plurality of chatting servers 427, a plurality of game servers 428, and a plurality of game DBs 429.

The access server 421 allows and manages access of the plurality of gamers 411, 412, and 413 to the on-line role-playing game by performing a regular member subscription and authentication process.

The user DB 424 is a DB in which game-related profiles of the plurality of gamers 411, 412, and 413, information on the game, and the like is stored and updated.

The game download manager 425 manages the RPG game program 426 downloaded to the plurality of gamers 411, 412, and 413, and, whenever the RPG game is versioned-up, new versions of the RPG game program 426 or downloads of the versioned-up RPG game program are sent to the gamers.

When the gamers play the role-playing game and accomplish the quest, the building development program 423 develops the buildings arranged on the road map in correspondence with the degree of experience of the gamers. For example, by applying the building development process to the on-line role-playing game, a limited map for progressing an RPG game story can be efficiently utilized, and diverse maps reflecting characteristics of gamers who access the same game for a long time can be provided without imposing a burden on the game server.

The RPG controller 422 controls general operations including the access to the game, the building development process, the game program download, the game progression, and the like.

In addition, the plurality of chatting servers 427, game servers 428, and game DB 429 cooperate together to progress the game under the control of the RPG controller 422. Specifically, a process to accomplish an NPC quest may be applied to the on-line role-playing game according to the embodiment of the present invention. Also, the gamers are gathered according to a massive multiplayer online (MMO) method. Or, the NPC quest is accomplished by connecting client PCs of the gamers in a P2P scheme while running in order to lessen a burden on the game server.

The game server 428 is prepared for each channel so that the plurality of gamers 411, 412, and 413 access to progress the game. Each game server is associated with the chatting server 427 and the game DB 429. The chatting server 427 allows the plurality of gamers 411, 412, and 413 to exchange or provide information when the game is progressed in the game server 428. In addition, the game DB 429 stores game-related information generated for each game server 428. Accordingly, in the on-line role-playing game system according to the embodiment of the present invention, the building development program 423 applies the development of the building arranged on the road map to each game server 428 independently. In addition, the building development program 423 develops non-character circumstances, such as the buildings arranged on the road map, such that a new building is created or similar buildings are additionally formed near existing buildings as the degree of experience of the gamers is increased whenever the gamers accomplish quests given to them. At this time, when the gamers accomplish the given quest, the game server 428 updates the road map and performs quest updating according to the updated road map.

Hereinafter, an on-line role-playing racing game according to an embodiment of the present invention, particularly an on-line role-playing racing game, will be described in detail with reference to FIGS. 5 and 6.

Figure 5:
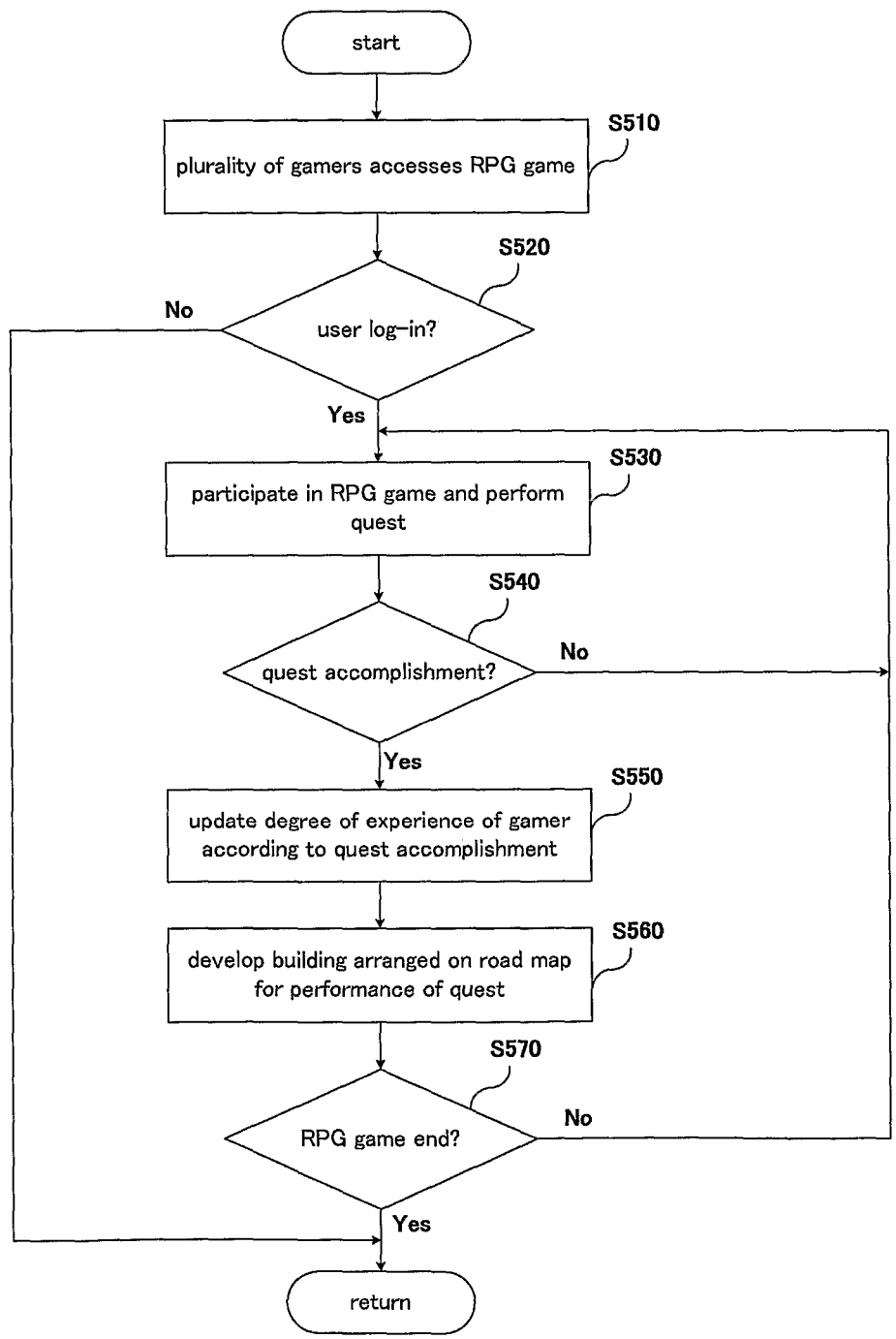
FIG. 5 is a flow chart illustrating an on-line role-playing game method using a building development process according to an embodiment of the present invention.

FIG. 5 is a flow chart illustrating an on-line role-playing game method using a building development process according to an embodiment of the present invention.

Referring to FIG. 5, first, when the plurality of gamers access the on-line RPG game server (S510), a user log-in process for a normal member subscription and authentication is performed (S520). Here, a plurality of role-playing game servers exist and can selectively participate in the game according to the degree of experience of the plurality of gamers.

Next, each gamer participates in the RPG game played by the plurality of gamers to perform the quest (S530).

Next, it is determined or monitored whether or not the quest is accomplished (S540). If it is determined that the quest is accomplished, the degree of experience of the gamer is updated (S550).

Next, the building arranged on the road map for the quest performance is developed (S560). That is, when the gamer accomplishes the quest, the degree of experience of the gamer is increased, and the building arranged on the road map is developed in correspondence with the increased degree of experience. As described above, the reason why the building arranged on the road map is developed is to efficiently utilize the road map and provide diverse maps to the gamers. The development of the building arranged on the road map is independently applied to the plurality of role-playing game servers. In addition, a new building is created or similar buildings are additionally formed near the existing building as the degree of experience of the gamer is increased whenever the gamers accomplish quests given to them.

Thereafter, it is determined whether or not the RPG game is to be terminated (S570).

At this time, the steps S530 to S560 can be performed repeatedly. Accordingly, when the gamer accomplishes the quest, the road map is updated and a quest, updated according to the updated road map, is performed.

The role-playing game according to the embodiment of the present invention is progressed in an MMORPG (Massive Multiplayer Online Role-Playing Game) scheme in which a plurality of gamers participate simultaneously and cooperate to accomplish a quest. In addition, clients PCs of the plurality of gamers are connected to one another in a P2P (Peer-to-Peer) scheme in order to lessen a burden on the game server progressing the role-playing game.

Figure 6:
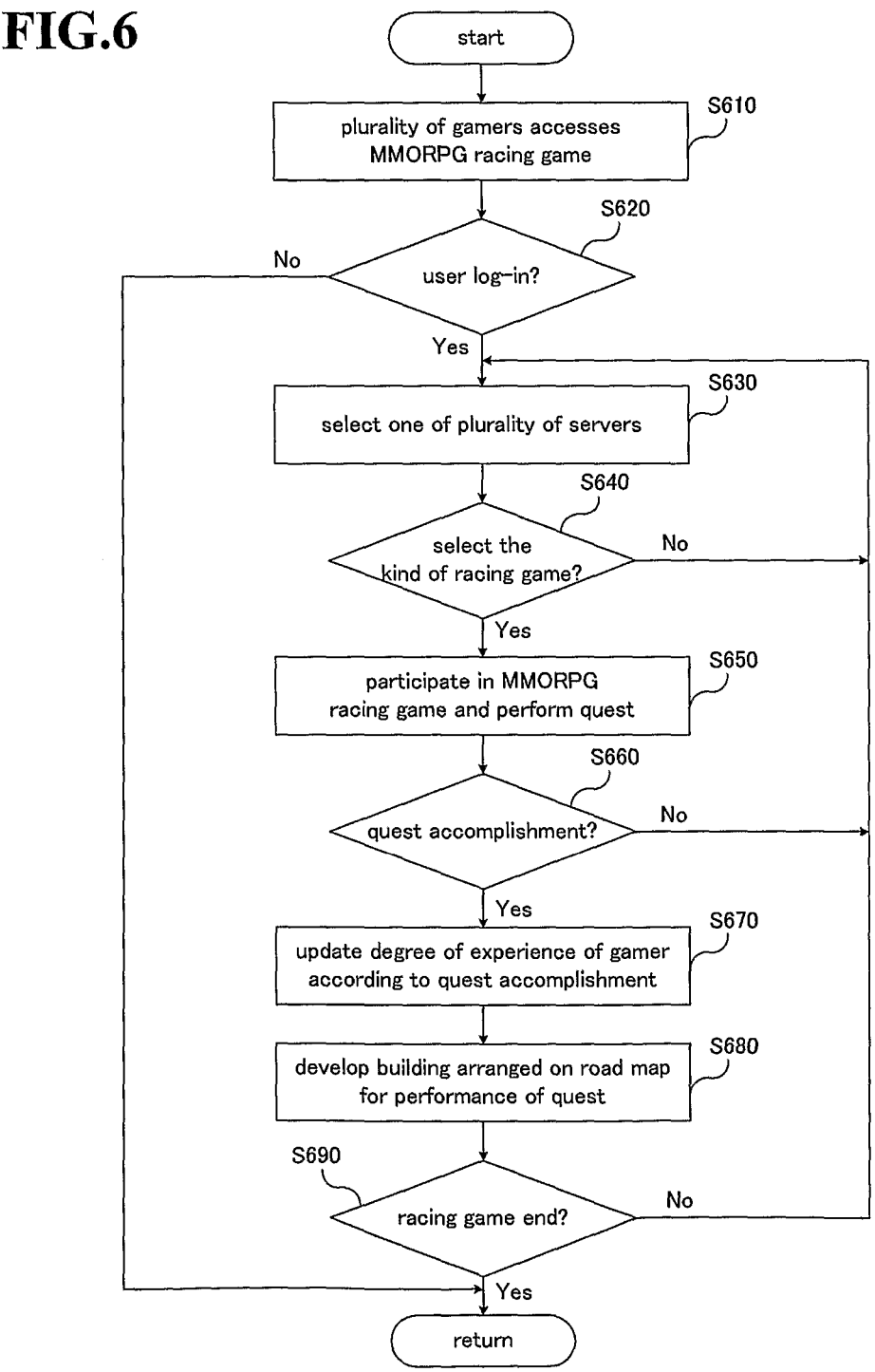
FIG. 6 is a flow chart illustrating an on-line role-playing racing game method using a building development process according to an embodiment of the present invention.

On the other hand, FIG. 6 is a flow chart illustrating an on-line role-playing racing game method using a building development process according to an embodiment of the present invention.

Referring to FIG. 6, in an on-line role-playing racing game according to an embodiment of the present invention, first, a plurality of gamers access a MMORPG racing game (S610), and then, perform a log-in process for a normal member subscription and authentication (S620).

Next, each of the plurality of gamers selects one of a plurality of servers (S630). Thereafter, each gamer selects the kind of racing game such as battle racing, destination racing game, or the like (S640).

Thereafter, each gamer plays an MMORPG racing game in which the plurality of gamers participate and perform an NPC quest (S650).

Next, it is determined whether or not the NPC quest is accomplished (S660). If it is determined that the NPC quest is accomplished, a degree of experience of the gamer is updated (S670). At this time, the MMORPG racing game is progressed between a player (PC) operated by each gamer and the NPC. That is, the on-line role-playing racing game according to the embodiment of the present invention employs a process of accomplishing the NPC quest, not a process of battling between racers. In addition, in this embodiment of the present invention, the NPC quest can be accomplished according to an MMO scheme or a P2P scheme. For example, cars can be gathered in a parking place corresponding to one server according to the MMO scheme, and actual running can be performed according to the P2P scheme in order to prevent performance of the server from being lowered. At this time, if a plurality of racers wishes to form one community to accomplish the same quest, multi-running of the MMO scheme can be used.

Next, the building arranged on the road map for the quest performance is developed (S680). That is, when the gamer accomplishes the quest, the degree of experience of the gamer is increased, and the building arranged on the road map is developed in correspondence with the increased degree of experience.

Thereafter, it is determined whether or not the racing game is to be terminated (S690). If it is determined that the racing game is to be terminated, the racing game is terminated.

Accordingly, this embodiment of the present invention provide a role-playing game (RPG) reflecting a degree of experience or power of a racer on-line. For example, when the racer performs a quest or catches an opponent car, the degree of experience of the racer is increased, and accordingly, the building arranged on the road map is developed.

In addition, there may exist a plurality of game servers and the building is developed independently between a plurality of different game servers. And also users of different game servers can watch the development of the building while running.

In addition, as described above, in this embodiment of the present invention, the NPC quest can be accomplished according to the MMO scheme or the P2P scheme. The actual running can be performed according to the P2P scheme in which client PCs of racers cooperate together in order to prevent performance of the server from being lowered. At this time, if the plurality of racers wishes to form one community to accomplish the same quest, the MMO scheme can be used.

Figure 7:
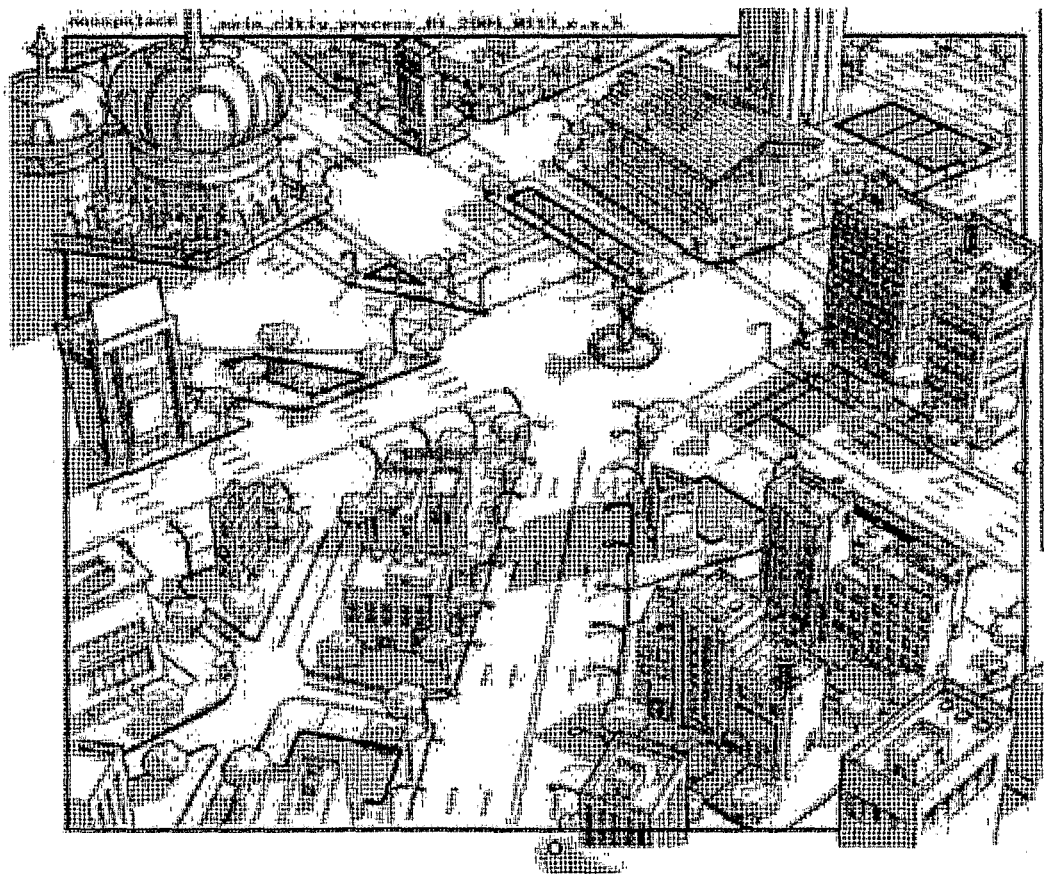
FIGS. 7 to 9 are diagrams illustrating a building development process of an on-line role-playing racing game according to an embodiment of the present invention.
Figure 8:
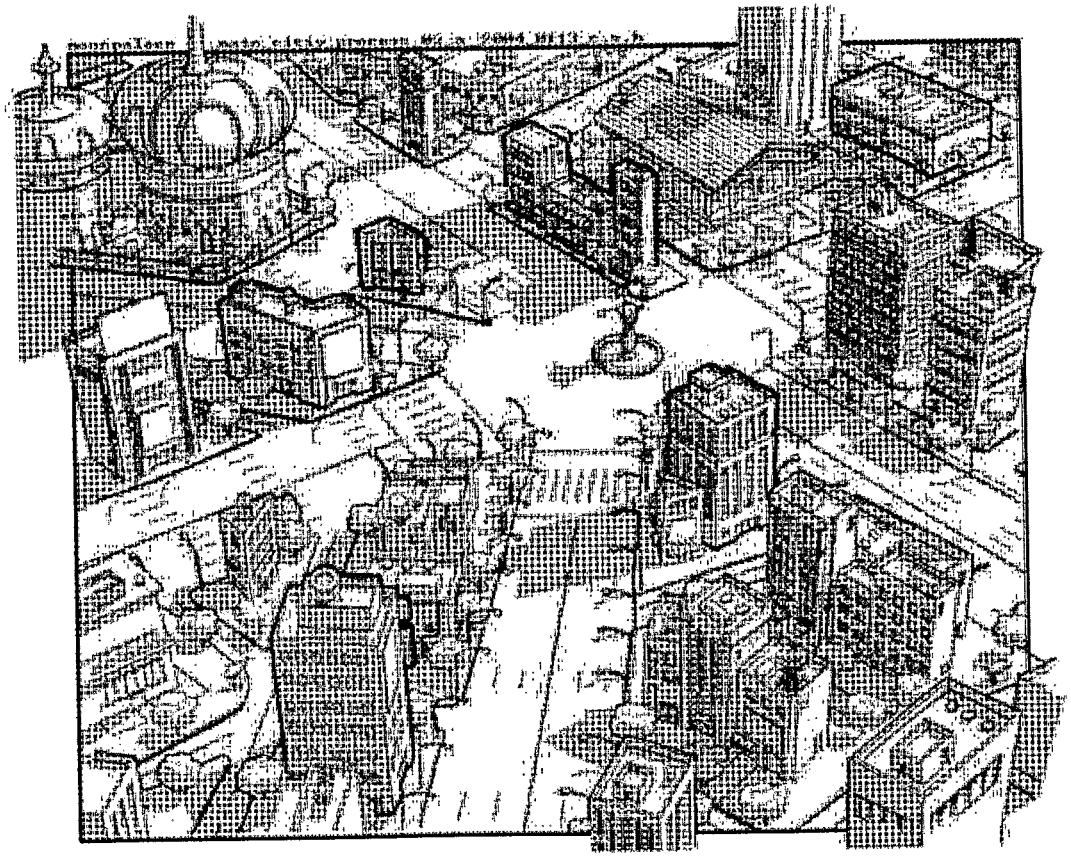
Figure 9:
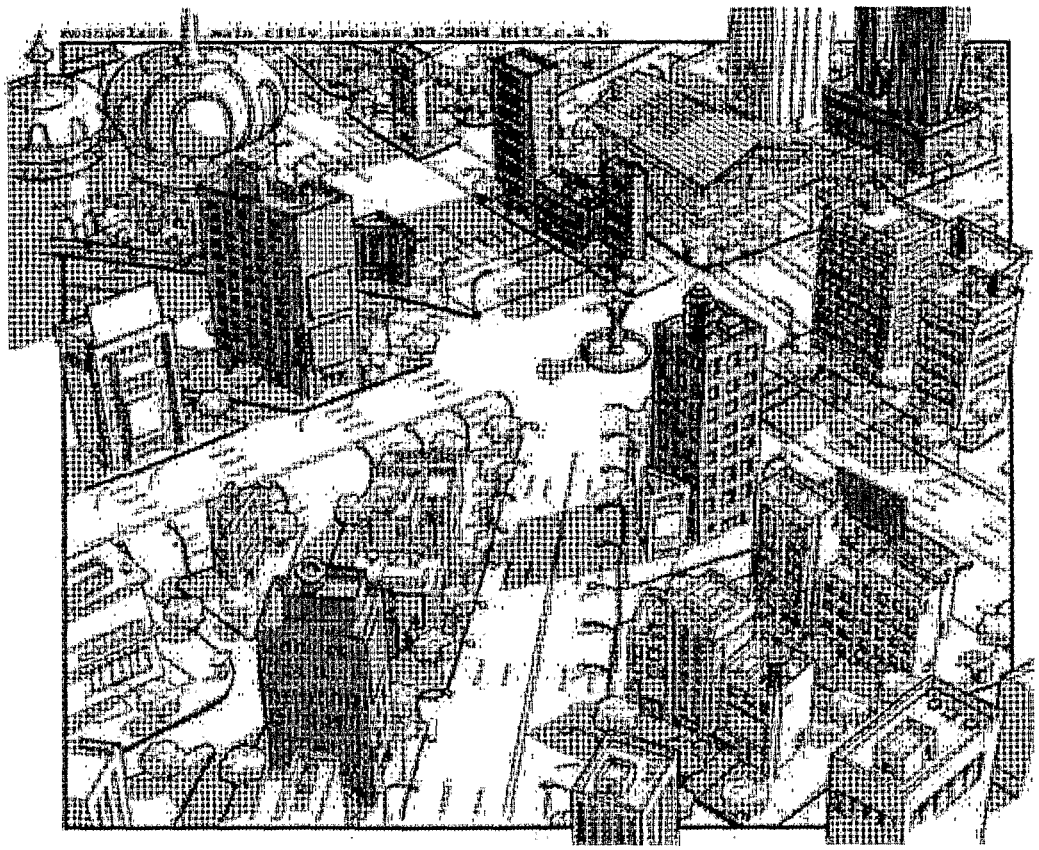

On the other hand, FIGS. 7 to 9 are diagrams illustrating a building development process of an on-line role-playing racing game according to an embodiment of the present invention.

FIGS. 7 to 9 illustrate a road which is a background of the game according to the embodiment of the present invention. FIG. 7 illustrates an initial state of a road map, FIG. 8 illustrates creation of a new building at a place at which no building originally exists when the gamer accomplishes the quest, and FIG. 9 illustrates a state where the building is additionally developed when the gamer accomplishes a next quest. Accordingly, since the road map is changed by developing only the building on the same road map, the road map can be more efficiently provided.

Figure 10:
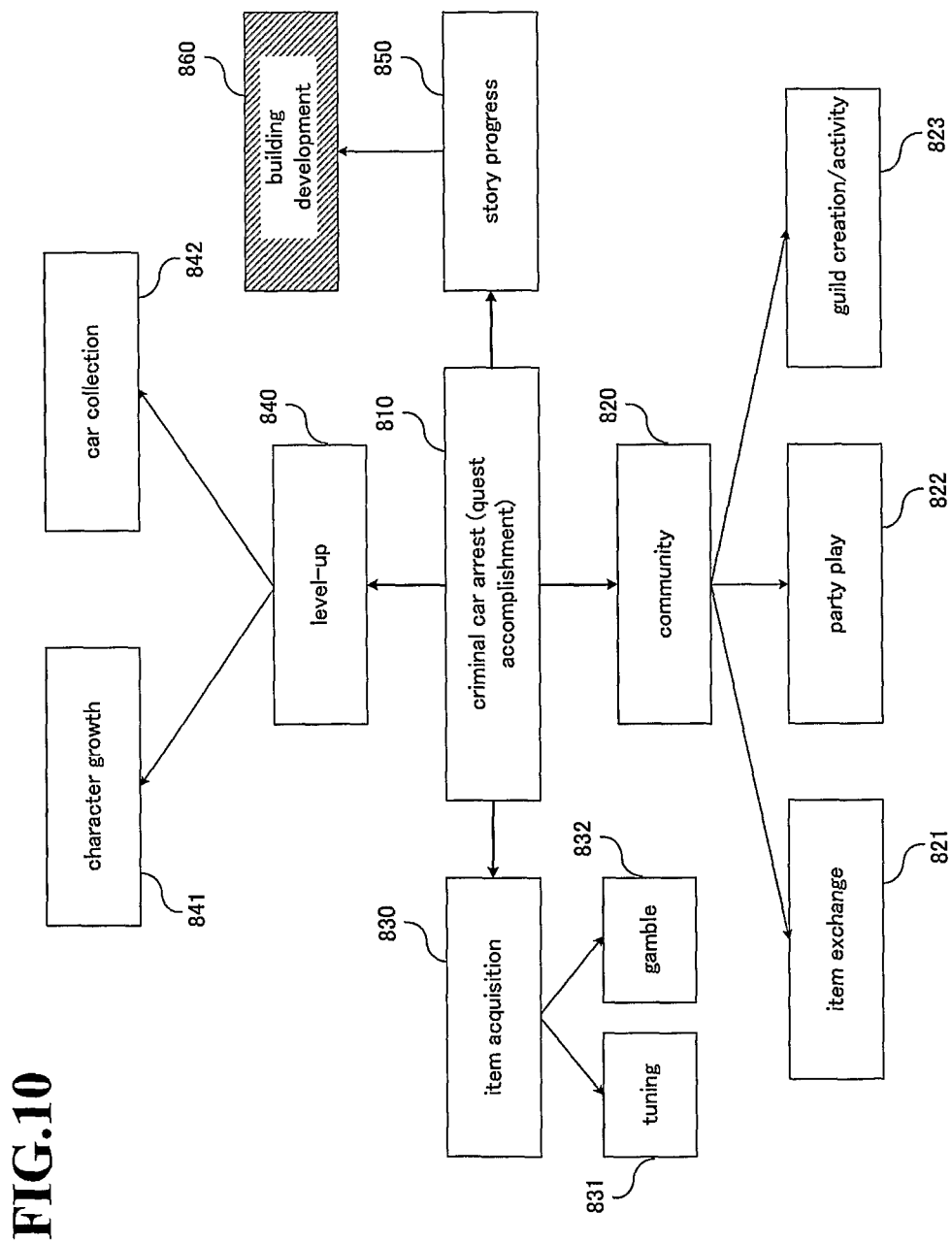
FIG. 10 is a diagram illustrating an example of a map when an on-line role-playing racing game according to an embodiment of the present invention is played.

On the other hand, FIG. 10 is a diagram illustrating an example of a map when an on-line role-playing racing game according to an embodiment of the present invention is played. This figure will be explained for each block for the purpose of explanation.

An on-line role-playing racing game according to an embodiment of the present invention is a game in which a racer accomplishes a quest between a player and an NPC and arrests a criminal car 810 as a result.

In the on-line role-playing racing game according to an embodiment of the present invention, the racer can acquire items by accomplishing the quest or purchase and exchange items 821 by paying a certain amount of money at a parking place. For example, the items may be classified into normal, super, hyper, set items, and the like. The items do not have their basic powers, but are defined randomly with a specified range. For example, an engine item may have the highest speed of either 110 km or 120 km. In addition, special powers affecting a level of power of a player may be added to the items. Further, the normal or super items may be changed to hyper items through a gamble 832. Such a change of the items is well known in the art of existing racing games, and therefore a detailed explanation thereof will be omitted.

In addition, the items may decorate a car diversely through tuning 831. For example, internal items and their appearance can be changed through the tuning 831. Such a change of the internal items and their appearance affects the performance of the car. The level of power of a player may limit the installation of internal items in the car. For example, the internal items and their appearance may be an engine, a gear, a handle, a turbine, brakes, and a car chassis. The most important factor in the tuning items is intuitive improvement of performance. The tuning items are generally classified into six kinds of an engine, a supercharger, suspension, brakes, a transmission, and an ECU (Electronic Control Unit). In addition, the tuning items may be upgraded through various combinations of items.

In addition, according to this embodiment of the present invention, external accessories may be purchased and installed in the car. The external accessories have no effect on the car performance and can be purchased with real money. The external accessories have no limit to their powers in installing them in the car. For example, the external accessories may be a car paintjob, stickers, wheels, an intercooler, a horn, a light, and the like.

In addition, in the on-line role-playing racing game according to this embodiment of the present invention, a community 820 may be created and activated. The activity of the community may include item exchange 821, party play 822, and guild creation/activity 823.

In addition, the on-line role-playing racing game according to this embodiment of the present invention may be progressed according to an MMORPG construction story 850. Here, the story 850 may include an individual story and an episode story.

Here, corresponding to the story progression 850, a gamer progresses the racing game to accomplish a quest, and accordingly, building development 860 is achieved as described above. Since the building development has been sufficiently explained, a detailed explanation thereof will be omitted here.

In addition, in the on-line role-playing racing game according to this embodiment of the present invention, when the player accomplishes the quest, a degree of experience and a level of power of the player are increased, and accordingly, the racing game can be leveled-up 840. Accordingly, characters can be grown 841 and other cars can be collected 842 according to the level-up 840. The collected cars can be stored in a garage of the player. In the collection of cars 842, different cars are collected for different character types and a collected car should be newly grown if the car is to be changed to a different car. In addition, when the level of power of a player reaches a certain level, the player can purchase a different car and there may be visual items shared by the same type of cars. In addition, even when the player transfers from his current car to a different car, power of characters remain unchanged.

Now, a quest in the on-line role-playing racing game according to the embodiment of the present invention will be described in detail.

For a quest in the on-line role-playing racing game according to the embodiment of the present invention, when a quest is requested, a basic racing game is progressed by performing the requested quest. A criminal car may be informed of wirelessly or may happen to be discovered. In a case of a single player, who is originally the secret police, he usually works an ordinary requested delivery. However, when a criminal car appears in the course of the delivery, he mobilizes while blowing a siren and clears the criminal car by colliding his car against the criminal car and stopping the criminal car.

The same quest is given for each type of car and a main quest is to pursue the criminal car. That is, when the player receives in real time information of appearance of an NPC, which is the criminal car, while running on the road, he arrests the criminal car (NPC). At this time, the player may form a party play with other players to arrest the criminal car (NPC) together, or arrest the criminal car (NPC) in such a manner that he collides his car against the criminal car a specified number of times or overturns the criminal car by impacting the criminal car.

Various quests in the on-line role-playing racing game according to the embodiment of the present invention may be provided and set so that the player can feel a quest of RPG as if it were a real quest, such as load moving, guarding, and the like.

In addition, there may exist a contingent quest in which a boss character-graded NPC, which is difficult for a player alone to clear, appears. In this case, a plurality of players may form a party play to clear the boss character-graded NPC. In addition, an individual story may be progressed according to the event quest.

Here, the party play is possible when the player forms a group, i.e., a party with other players at the parking place or on the road under application of the MMORPG scheme to the game. In the party play, when the players receive the information of appearance of the criminal car, there appears a plurality of more powerful and speedy criminal cars. For example, there appear NPCs corresponding to an average of levels of the players, the plurality of players forming the party play arrest the criminal cars together, and a degree of experience attained as a result of the accomplishment of the quest is higher than that obtainable when a player alone accomplishes the quest. In some case, an intelligent play such as road blocking or a strategic play for each characteristic of cars may be performed.

In addition, in the party play, a player of a high level may help other players of a low level, or there may exist a special quest appearing only when a plurality of players performs a party play. Moreover, in addition to the arrest of the criminal cars, different styles of quests may be also progressed in common.

Figure 11:
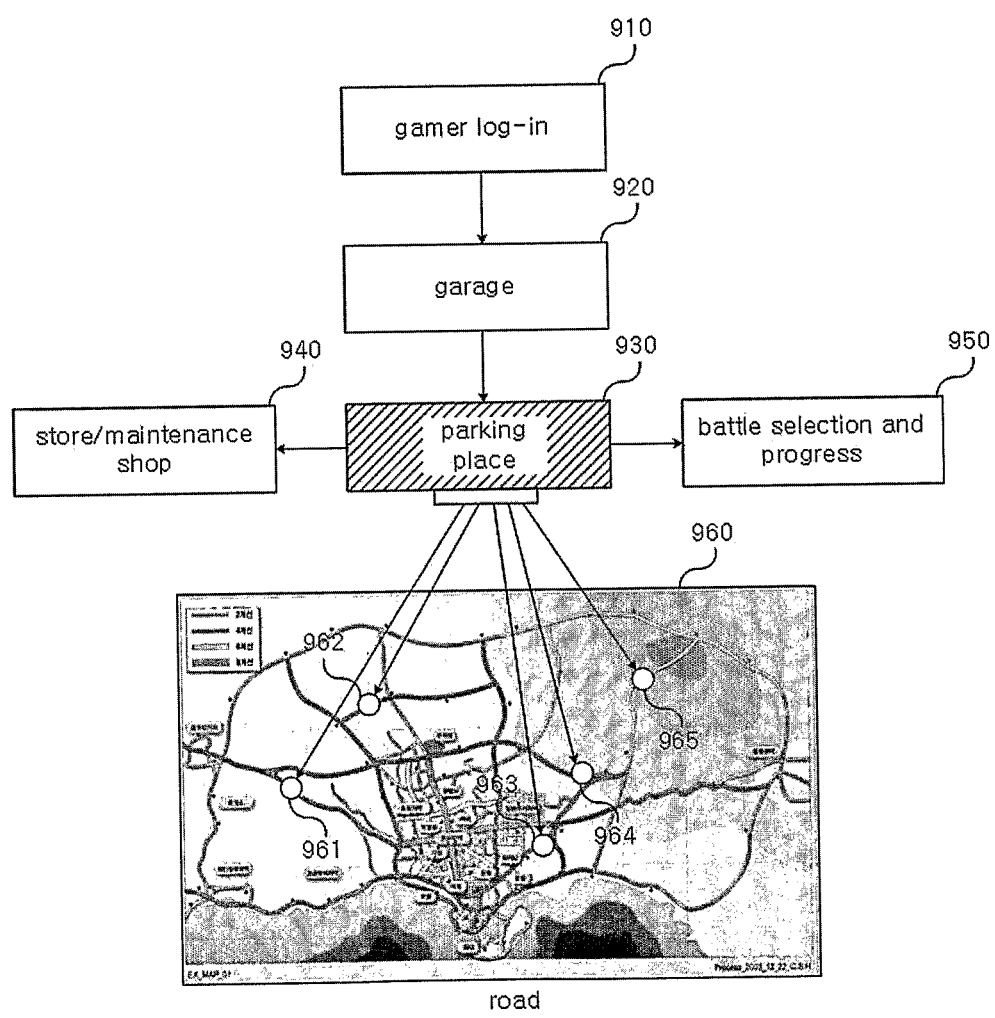
FIG. 11 is a diagram illustrating a structure in which an on-line role-playing racing game according to an embodiment of the present invention is played.

FIG. 11 is a diagram illustrating a structure in which an on-line role-playing racing game according to an embodiment of the present invention is played.

Referring to FIG. 11, an on-line role-playing racing game according to an embodiment of the present invention is progressed according to the following sequence.

First, a gamer logs into the racing game (910), prepares his car at his garage (920), and enters a parking place (930).

The parking place (930) functions as a lobby for other games and, for example, is a racing preparation place for community creation and activity, item purchase and exchange, and the like. At this time, the gamer may enter a store/maintenance shop (940) for item purchase and exchange, and select and progress (950) battles in the parking place (930).

In addition, many users may enter the parking place (930). In this embodiment of the present invention, the parking place (930) can accommodate 1000 users at a maximum. In this case, one parking place corresponds to one game server in the game system according to the embodiment of the present invention. That is, one parking place is provided for each game server corresponding to each game channel.

In addition, in this embodiment of the present invention, the road (960) can accommodate 24 racers at a maximum per area, for example. The reason of such a limitation of accommodation is that racing may be confusing and it is difficult to manage the racing game if too many racers are allocated in one area.

In addition, the racers can turn back to the parking place (930) at any time while the on-line role-playing racing game according to the embodiment of the present invention is being played. That is, certain points (961, 962, 963, 964, and 965) on the road (960) are warp points, and a player car of a gamer can turn back to the parking place 930 at any time.

In the end, the embodiment of the present invention is directed to a building development process applied to the on-line RPG game in which buildings arranged on the road map are developed and grown according to the degree of experience of the gamers who perform the quests. Such building development is applied in the same way in a single server, and a new building can be created or similar buildings can be additionally formed near the existing building as the degree of experience of the gamers is increased whenever the gamers accomplish quests given to the gamers.

On the other hand, according to an embodiment of the present invention, there is provided a recording medium including a program for implementing a method of the on-line role-playing game in which a plurality of gamers participate and to which the building development process is applied.

While this invention has been described in connection with certain exemplary embodiments, it is to be understood by those skilled in the art that the invention is not limited to the disclosed embodiments, but, on the contrary, is intended to cover various modifications and equivalent arrangements included within the spirit and scope of the appended claims.

According to the present invention, by applying a building development process to an on-line role-playing game, a limited map for progressing an RPG game story can be efficiently utilized.

In addition, according to the present invention, diverse maps reflecting characteristics of gamers who access the same game for a long time can be provided without imposing a burden on a game server.

As used in this application, the term "module" is intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A method using an on-line game system including a roleplaying game (RPG) controller, an access server, and a building development program residing on a server separate from an on-line game server for operating an on-line role-playing game to provide independent map data for each of a plurality of gamers, the method comprising:

receiving requests for accessing the on-line game server from the plurality of gamers via the access server;

providing a multiplayer on-line role-playing game application on the RPG controller to be played in a virtual space associated with map data in response to the requests;

determining a degree of proficiency of each gamer corresponding to a quest performance in the virtual space during the on-line role-playing game via the RPG controller;

independently developing the map data for each of the plurality of gamers via the building development program, the map data comprising the virtual space and a building associated with the quest performance of the on-line role-playing game with respect to each gamer by creating the building in the virtual space according to the degree of proficiency when the degree of proficiency corresponds to the quest performance being successfully completed and by not creating the building in the virtual space when the degree of proficiency corresponds to the quest performance not being successfully completed; and providing the independent map data, respectively, to each of the plurality of gamers.

2. The method of claim 1, further comprising:

monitoring the quest performance of each gamer to determine whether an event associated with the quest performance is accomplished;

updating the degree of proficiency of each gamer based on the monitored quest performance; and changing the map data of the on-line role-playing game by developing the building according to the monitored quest performance.

3. The method of claim 1, wherein the independently developing the map data comprises creating a new building according to the determined degree of the proficiency of each gamer.

4. The method of claim 1, wherein developing the map data comprises growing the building in the virtual space as the degree of proficiency increases.

5. The method of claim 1, wherein the quest performance is conducted in the same virtual space where the building is created.

6. A method using an on-line game system including a roleplaying game (RPG) controller, an access server, and a building development program residing on a server separate from an on-line game server for operating a game to provide independent map data for each of a plurality of gamers, the method comprising:

receiving one or more requests for accessing the on-line game server from the plurality of gamers via the access server;

providing multiplayer on-line role-playing racing game applications in response to detection of the requests, the game applications comprising virtual cars being selected by the plurality of gamers;

determining a degree of proficiency of each gamer via the RPG controller corresponding to performing a quest developed during performing of the game applications in a virtual place associated with the map data;

independently developing the map data for each of the plurality of gamers via the building development program, the map data comprising the virtual space and a building associated with performing the game applications with respect to each gamer by creating the building in the virtual space according to the degree of proficiency when the degree of proficiency corresponds to the quest performance being successfully completed and by not creating the building in the virtual space when the degree of proficiency corresponds to the quest performance not being successfully completed; and providing the independent map data, respectively, to each of the plurality of gamers.

7. The method of claim 6, wherein the independently developing map data comprises creating a new building according to the proficiency of the respective gamers that is increased according to a level of a quest accomplished by the respective of the plurality of gamers.

8. The method of claim 6, wherein the processor is configured to independently develop the map data depending on the degree of proficiency of each gamer, and wherein the map is developed by presenting the virtual space and the building to each gamer based on at least one of a performance and a level of the quest.

9. The method of claim 6, wherein independently developing the map data comprises allocating one of a plurality of on-line role-playing racing game servers, and creating the virtual roads, the virtual buildings, or both the virtual roads and the virtual buildings that are independently developed by the allocated game server.

10. A non-transitory computer-readable medium comprising an executable program which, when executed by an on-line game system, performs the following steps for operating an on-line role-playing game to provide independent map data for each gamers:

receiving requests from a plurality of peer-to-peer gamers to access a game server to participate in a multiplayer on-line game;

providing a multiplayer on-line role-playing game application to be played in a virtual space associated with map data in response to detection of the requests;

determining a degree of proficiency of each gamer associated with performing a quest developed during the multiplayer on-line game in the virtual space;

independently creating map data for each of the plurality of gamers by selectively creating a virtual building in the virtual space associated with map data of the on-line role-playing game for performing the quest of the on-line role-playing game according to the degree of proficiency when the degree of proficiency corresponds to the quest performance being successfully completed and by not creating the building in the virtual space when the degree of proficiency corresponds to the quest performance not being successfully completed; and providing the independent map data, respectively, to each of the plurality of gamers.

11. A non-transitory computer-readable medium comprising an executable program which, when executed by an on-line game system, performs the following steps for operating an on-line role-playing game to provide independent map data for each gamers:

receiving requests for accessing an on-line game server from a plurality of gamers;

providing a multiplayer on-line role-playing racing game application in response to the requests;

determining a degree of proficiency of the respective gamers associated with performing a quest developed during performance of racing on a virtual road with virtual cars;

independently developing map data for each of the plurality of gamers, the map data comprising virtual roads and virtual buildings arranged for performing the quest of the on-line role-playing racing game with respect to the respective gamers by creating the virtual buildings adjacent the virtual roads according to the degree of proficiency when the degree of proficiency corresponds to the quest performance being successfully completed and by not creating the building in the virtual space when the degree of proficiency corresponds to the quest performance not being successfully completed; and providing the independent map data, respectively, to each of the plurality of gamers.

\* \* \* \* \*